(12) United States Patent
Jun et al.

(10) Patent No.: US 9,067,547 B2
(45) Date of Patent: Jun. 30, 2015

(54) DOOR BELT MOLDING FOR VEHICLE

(71) Applicant: Hyundai Motor Company, Seoul (KR)

(72) Inventors: Won Seok Jun, Seongnam-si (KR); Won Il Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/102,109

(22) Filed: Dec. 10, 2013

(65) Prior Publication Data
US 2014/0183901 A1 Jul. 3, 2014

(30) Foreign Application Priority Data
Dec. 28, 2012 (KR) .................. 10-2012-0157474

(51) Int. Cl.
*B60J 5/00* (2006.01)
*B60R 13/06* (2006.01)
*B60R 13/04* (2006.01)
*B60J 10/00* (2006.01)
*B60J 10/04* (2006.01)

(52) U.S. Cl.
CPC .............. *B60R 13/06* (2013.01); *B60R 13/04* (2013.01); *B60J 10/008* (2013.01); *B60J 10/041* (2013.01)

(58) Field of Classification Search
CPC ........ B60R 13/04; B60J 10/008; B60J 10/041
USPC ............. 296/146.2, 146.9, 93; 49/502, 490.1, 49/492.1, 493.1; 52/716.6, 716.7
See application file for complete search history.

(56) References Cited

U.S. PATENT DOCUMENTS

2003/0042752 A1 * 3/2003 Arata et al.

FOREIGN PATENT DOCUMENTS

| JP | 4096300 B2 | 6/2008 |
| JP | 4314443 B2 | 8/2009 |
| JP | 2012-171559 A | 9/2012 |

* cited by examiner

*Primary Examiner* — Stephen Gordon
(74) *Attorney, Agent, or Firm* — McDermott Will & Emery LLP

(57) ABSTRACT

A door belt molding for a vehicle installed in a door panel of a vehicle kept close to a door glass may include a weather strip having a fixing groove and a locker formed in upper and lower portions of an external side to be mounted in a hem of the door panel and a plurality of contact lips disposed on an internal side to contact the door glass. The door belt molding may further include a mold having supporters formed at upper and lower ends to be installed in the door panel to surround the weather strip and a mold clip installed in the hem of the door panel through a cut portion of the weather strip to fix the mold to the door panel.

8 Claims, 7 Drawing Sheets

DOOR BELT MOLDING FOR VEHICLE

CROSS-REFERENCE TO RELATED APPLICATION

This application claims the benefit of priority to Korean Patent Application No. 10-2012-0157474 filed in the Korean Intellectual Property Office on Dec. 28, 2012, the entire contents of which are incorporated herein by reference.

TECHNICAL FIELD

The present disclosure relates to a door belt molding for a vehicle. More particularly, the present disclosure relates to a door belt molding for a vehicle prevented from being separated from a door panel, easily assembled, and having a separated structure so that post-processing such as plating and painting may be performed.

BACKGROUND

In general, an ascendable and descendible door glass is provided in a door of a vehicle.

Moldings are installed between an internal surface of the door glass and a door trim and between an external surface of the door glass and an out panel of the door to remove dust or frost attached to the door glass, to prevent alien substances from being flown to a vehicle when the door glass ascends and/or descends, and to decorate a combination unit between the door glass and the door panel.

As described above, the molding installed between the door glass and a door body, that is, between the door trim and the out panel is referred to as a door belt molding.

The conventional door belt molding is formed of two or three materials. For example, a part fixed to the door trim or the out panel of the vehicle exposed to the outside is formed of a hard material and a lip which is disposed near a surface of the door glass is formed of a soft material.

Therefore, the door belt molding is commonly manufactured by double-pressing different types of materials. The door belt molding manufacturing as described above is commonly fixed on the door trim or the out panel of the door by an additionally manufactured clip.

Recently, as vehicles are gentrified, the door belt molding is manufactured to have the same color as that of a vehicle body or to be high-gloss black.

However, in the above-described conventional door belt molding, since a weather strip and a mold are integrated with each other, separating the weather strip and the mold from each other is not possible that the weather strip may be contaminated and damaged. Also, plating and painting the door belt molding are not manageable that gentrifying a vehicle is difficult.

In addition, since an additional locking structure does not exist in the conventional door belt molding, the door belt molding is separated from the door panel so that assembling of the door belt molding and door panel is deteriorated. Also, since an insert steel is inserted in the weather strip in the conventional door belt molding, the weight of the door belt molding is increased.

The above information disclosed in this background section is only for enhancement of understanding of the background of the present disclosure and therefore it may contain information that does not form the prior art that is already known in this country to a person of ordinary skill in the art.

SUMMARY

An exemplary embodiment of the present disclosure provides a door belt molding for a vehicle in which a weather strip is mounted in a door panel through a fixing groove and a locker and a mold is mounted in the door panel through a mold clip to prevent separation of the door belt molding from the door panel, easily assemble with the door panel, and reduce weight by removing an insert steel inserted into the weather strip.

Another embodiment of the present disclosure provides a door belt molding for a vehicle in which a weather strip and a mold are separated from each other so that surface post-processing such as plating and painting may be performed.

An exemplary embodiment of the present disclosure provides a door belt molding for a vehicle installed in a door panel of a vehicle kept close to a door glass, including a weather strip having a fixing groove and a locker disposed in upper and lower portions of an external side to be mounted in a hem of the door panel and having a plurality of contact lips formed at an internal side to contact the door glass, a mold having supporters formed at upper and lower ends to be installed in the door panel to surround the weather strip, and a mold clip installed in the hem of the door panel through a cut portion of the weather strip to fix the mold to the door panel.

The weather strip may include the fixing groove formed in an upper portion of the external surface to be inserted into the hem of the door panel, the locker formed in a lower portion of an external surface protruded to support a lower side of the hem of the door panel, and the contact lips disposed at upper and lower portions of an internal surface to contact the door glass.

The mold clip may include a clip front surface, a middle elastic installer inserted into the hem of the door panel to be installed together with the clip front surface, lower elastic ends integrally formed in the clip front surface so that ends thereof are supported by a lower supporter of the mold, and an upper elastic end formed by cutting off a part of the clip front surface so that an end thereof is supported by an upper supporter of the mold.

In the mold clip, the middle elastic installer may be disposed in a center of the clip front surface, the upper elastic end may be disposed in a center of the middle elastic installer on an opposite side, and the lower elastic ends may be disposed outside the installer.

The installer may be bent downward from an upper side of the clip front surface to run parallel with the clip front surface and a guide opened outward may be formed at a leading end of the installer.

The lower elastic ends may be slopingly bent downward from the upper side of the clip front surface so that leading ends thereof may be supported by the lower supporter of the mold.

In the upper elastic end, a central part of the clip front surface may be cut off and may be slopingly bent upward from the upper side of the middle elastic installer so that a leading end of the upper elastic end may be supported by the upper supporter of the mold.

In the clip front surface, separating preventers bent to be locked on an internal end of the hem of the door panel may be formed.

DETAILED DESCRIPTION OF THE EMBODIMENTS

Figure 1:
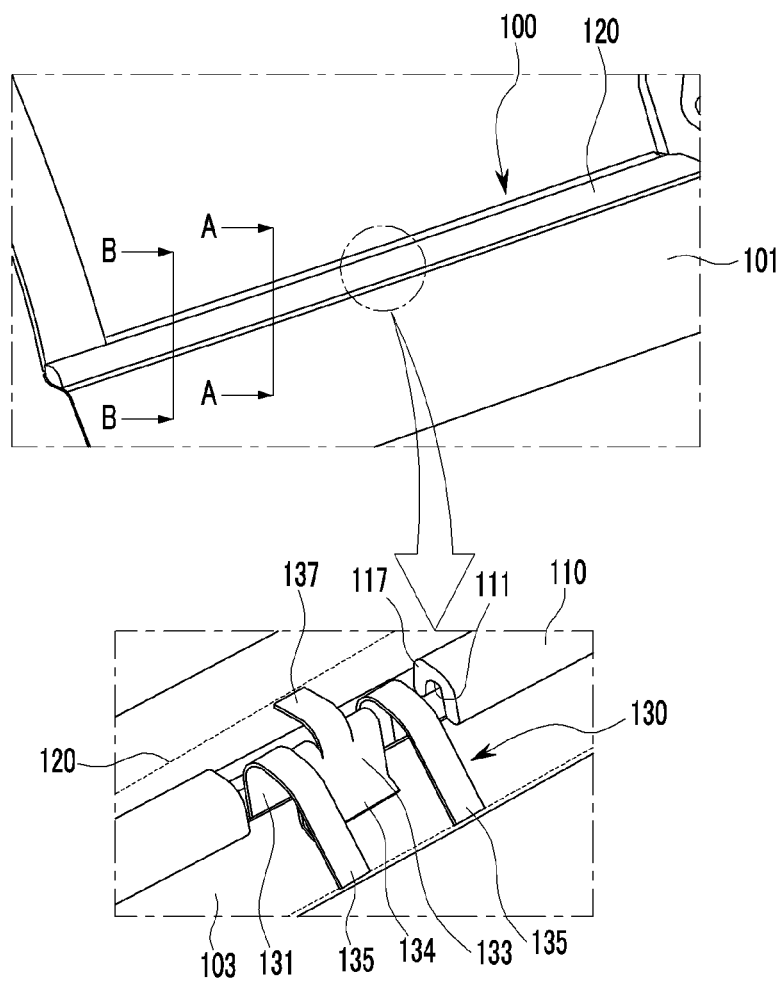
FIG. 1 is a perspective view of a door belt molding for a vehicle according to an exemplary embodiment of the present disclosure.

Hereinafter, an exemplary embodiment of the present disclosure will be described in detail with reference to the accompanying drawings.

Since sizes and thicknesses of elements in the drawings are arbitrarily represented for convenience sake, the present disclosure is not limited to illustrations of the drawings. In order to clearly express portions and regions, thicknesses are exaggerated.

In addition, in order to clearly describe an exemplary embodiment of the present disclosure, portions that are not related to description are omitted.

Figure 2:
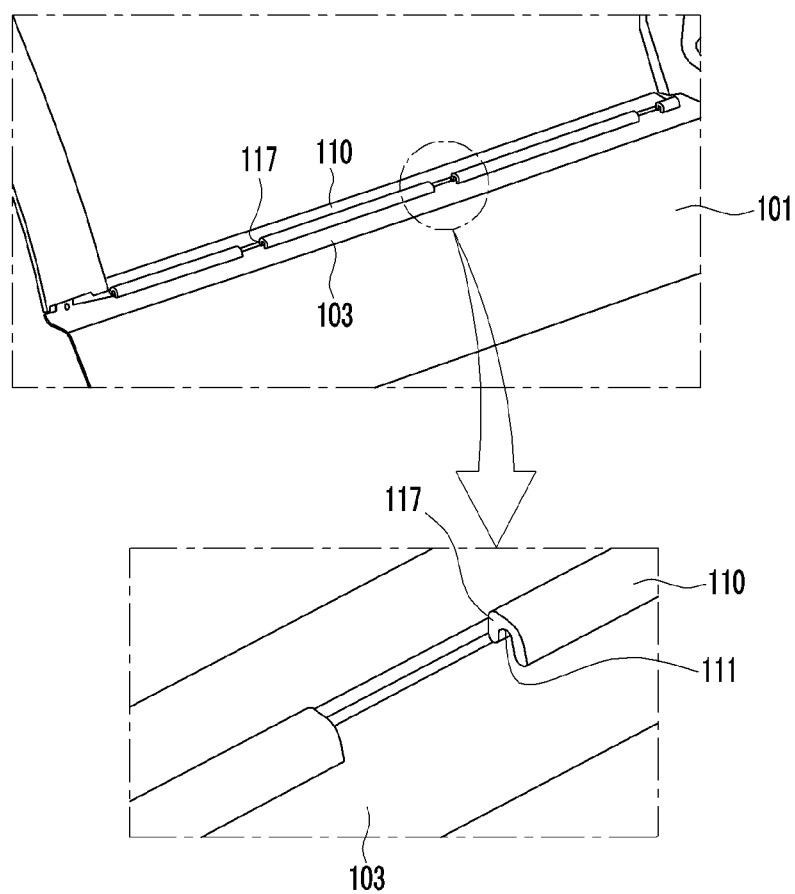
FIG. 2 is a perspective view illustrating that a weather strip applied to a door belt molding according to an exemplary embodiment of the present disclosure is combined with a door panel.
Figure 3:
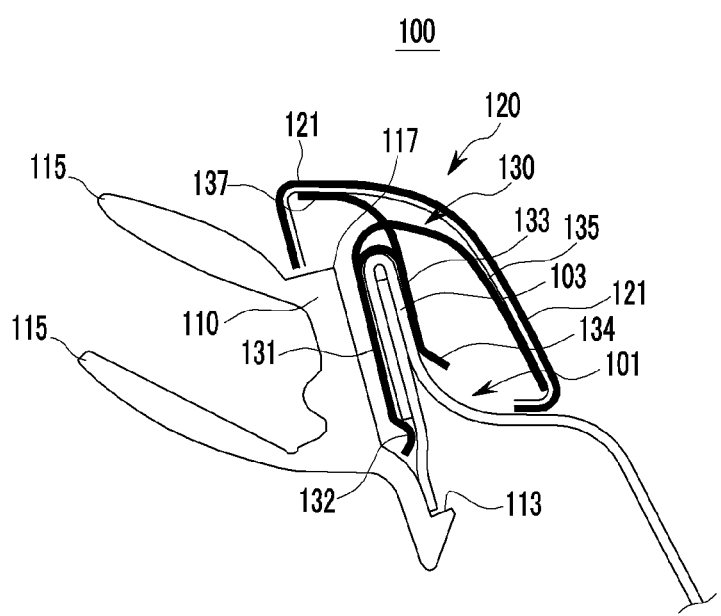
FIG. 3 is a cross-sectional view taken along the line A-A of FIG. 1.
Figure 4:
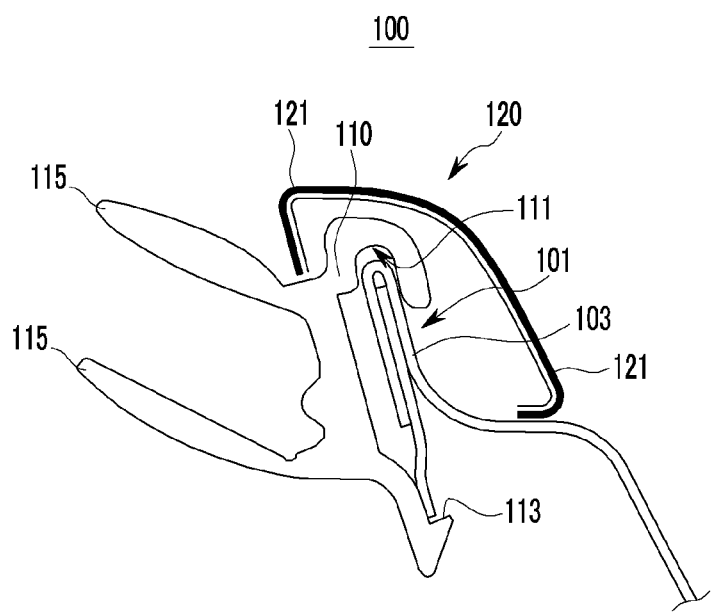
FIG. 4 is a cross-sectional view taken along the line B-B of FIG. 1.
Figure 5:
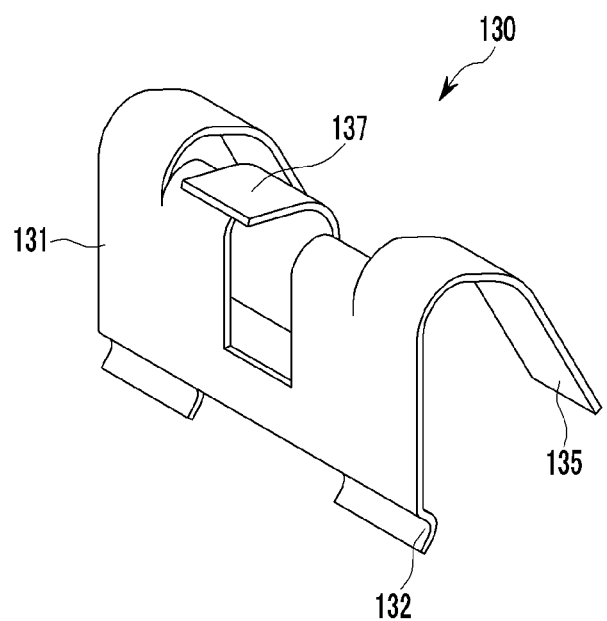
FIG. 5 is a front perspective view of a mold clip applied to a door belt molding for a vehicle according to an exemplary embodiment of the present disclosure.
Figure 6:
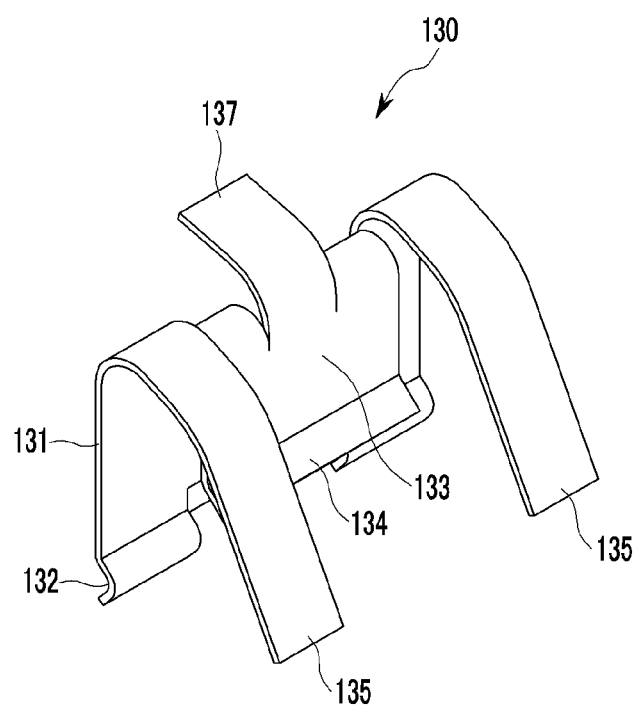
FIG. 6 is a rear perspective view of a mold clip applied to a door belt molding for a vehicle according to an exemplary embodiment of the present disclosure.
Figure 7:
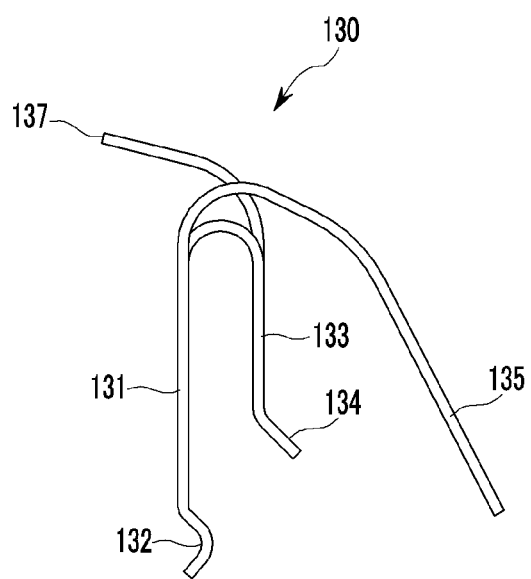
FIG. 7 is a side view of a mold clip applied to a door belt molding for a vehicle according to an exemplary embodiment of the present disclosure.

FIG. 1 is a perspective view of a door belt molding for a vehicle according to an exemplary embodiment of the present disclosure. FIG. 2 is a perspective view illustrating that a weather strip applied to a door belt molding according to an exemplary embodiment of the present disclosure is combined with a door panel. FIG. 3 is a cross-sectional view taken along the line A-A of FIG. 1. FIG. 4 is a cross-sectional view taken along the line B-B of FIG. 1. FIG. 5 is a front perspective view of a mold clip applied to a door belt molding for a vehicle according to an exemplary embodiment of the present disclosure. FIG. 6 is a rear perspective view of a mold clip applied to a door belt molding for a vehicle according to an exemplary embodiment of the present disclosure. FIG. 7 is a side view of a mold clip applied to a door belt molding for a vehicle according to an exemplary embodiment of the present disclosure.

Referring to FIGS. 1 through 7, a vehicle door belt molding 100 according to an exemplary embodiment of the present disclosure installed in a door panel 101 of a vehicle, which is kept close to a door glass (not shown), removes dust and/or frost on the door glass and prevents alien substances from being flown to a vehicle when the door glass ascends and/or descends, and decorates a combination unit between the door glass and the door panel 101.

The vehicle door belt molding 100 is prevented from being separated from the door panel 101, easily assembled to the door panel 101, and has a structure in which a weather strip 110 and a mold 120 are separated from each other so that surface post-processing such as plating and painting may be performed.

For this purpose, the vehicle door belt molding 100 according to the exemplary embodiment of the present disclosure includes the weather strip 110, the mold 120, and a mold clip 130.

Referring to FIG. 4, a fixing groove 111 and a locker 113 are formed in upper and lower portions of an external side of the weather strip 110 so that the weather strip 110 is mounted in a hem 103 of the door panel 101. A plurality of contact lips 115 are formed on an internal side of the weather strip 110 to contact the door glass.

The weather strip 110 includes the fixing groove 111, the locker 113, and the contact lips 115.

The fixing groove 111 is formed in an upper portion of an external surface to be inserted into the hem 103 of the door panel 101.

The locker 113 is formed in a lower portion of an external surface to protrude and support a lower side of the hem 103 of the door panel 101.

The contact lips 115 are formed in upper and lower portions of an internal surface to contact the door glass.

Supporters 121 are disposed at upper and lower ends of the mold 120 so that the mold 120 is installed in the door panel 101 to surround the upper portion of the weather strip 110.

According to the exemplary embodiment of the present disclosure, the mold clip 130 is installed in the hem 103 of the door panel 101 through a cut portion 117 of the weather strip 110 to fix the mold 120 to the door panel 101.

Here, the mold clip 130 includes a clip front surface 131, a middle elastic installer 133, lower elastic ends 135, and an upper elastic end 137.

The clip front surface 131 is supported by an internal surface of the hem 103 of the door panel 101.

Separating preventers 132 bent to be locked on an internal end of the hem 103 of the door panel 101 are formed in the clip front surface 131.

The separating preventers 132 are supported by the internal end of the hem 103 of the door panel 101 to prevent the mold 120 from being separated from the door panel 101.

The middle elastic installer 133 is inserted into the hem 103 of the door panel 101 to be installed together with the clip front surface 131.

The middle elastic installer 133 is bent downward from an upper side of the clip front surface 131 to run parallel with the clip front surface 131 and a leading end is formed a guide 134 opened outward.

Here, the guide 134 is formed to be easily assembled with the hem 103 of the door panel 101.

The lower elastic ends 135 are integrally formed in the clip front surface 131 so that ends of the lower elastic ends 135 are supported by the lower supporter 121 of the mold 120.

The lower elastic ends 135 are slopingly bent downward from the upper side of the clip front surface 131 so that leading ends of the lower elastic ends 135 are supported by the lower supporters 121 of the mold 120.

The upper elastic end 137 is formed by cutting off a part of the clip front surface 131 and an end of the upper elastic end 137 is supported by the upper supporters 121 of the mold 120.

That is, the upper elastic end 137 is formed so that a central part of the clip front surface 131 is cut off and is slopingly bent upward from the upper side of the middle elastic installer 133. Therefore, the leading end of the upper elastic end 137 is supported by the upper supporters 121 of the mold 120.

Therefore, in the mold clip 130, the middle elastic installer 133 is formed in the center of the clip front surface 131, the upper elastic end 137 is formed in a center of the middle elastic installer 133 on an opposite side, and the lower elastic ends 135 are formed outside the middle elastic installer 133.

As described above, when the vehicle door belt molding 100 according to the exemplary embodiment of the present disclosure is applied, the weather strip 110 is mounted in the door panel 101 through the fixing groove 111 and the locker 113 and the mold 120 is mounted in the door panel 101 through the mold clip 130 so that the mold 120 is prevented from being separated from the door panel 101 and is easily assembled with the door panel 101 and an insert steel inserted into the weather strip 110 is removed to reduce a weight.

In addition, the weather strip 110 and the mold 120 are separated from each other so that surface post-processing such as plating and painting may be performed. Therefore, an outer appearance is fine and gentrified.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

What is claimed is:

1. A door belt molding for a vehicle installed in a door panel of a vehicle close to a door glass, comprising:
    a weather strip having a fixing groove and a locker formed in upper and lower portions of an external side to be mounted in a hem of the door panel and having a plurality of contact lips disposed on an internal side to contact the door glass;
    a mold having supporters disposed at upper and lower ends to be installed in the door panel to surround the weather strip; and
    a mold clip installed in the hem of the door panel through a cut portion of the weather strip to fix the mold to the door panel.

2. The door belt molding for a vehicle of claim 1, wherein the weather strip comprises:
    the fixing groove formed in an upper portion of an external surface to be inserted into the hem of the door panel;
    the locker formed in a lower portion of an external surface to protrude to support a lower side of the hem of the door panel; and
    the contact lips formed in upper and lower portions of an internal surface to contact the door glass.

3. The door belt molding for a vehicle of claim 1, wherein the mold clip comprises:
    a clip front surface;
    a middle elastic installer inserted into the hem of the door panel to be installed together with the clip front surface;
    lower elastic ends integrally formed in the clip front surface so that ends thereof are supported by a lower one of the supporters of the mold; and
    an upper elastic end defined by a cutting off part of the clip front surface so that an end thereof is supported by an upper one of the supporters of the mold.

4. The door belt molding for a vehicle of claim 3, wherein, in the mold clip,
    the middle elastic installer is formed in a center of the clip front surface, the upper elastic end is formed in a center of the middle elastic installer on an opposite side, and the lower elastic ends are formed outside the middle elastic installer.

5. The door belt molding for a vehicle of claim 3, wherein the middle elastic installer is bent downward from an upper side of the clip front surface to run parallel with the clip front surface and a guide opened outward is formed at a leading end of the middle elastic installer.

6. The door belt molding for a vehicle of claim 3, wherein the lower elastic ends are slopingly bent downward from an upper side of the clip front surface so that leading ends thereof are supported by the lower supporter of the mold.

7. The door belt molding for a vehicle of claim 3, wherein, in the upper elastic end,
    a central part of the clip front surface is cut off and is slopingly bent upward from an upper side of the middle elastic installer so that a leading end of the upper elastic end is supported by the upper supporter of the mold.

8. The door belt molding for a vehicle of claim 3, wherein, in the clip front surface,
    separating preventers bent to be locked on an internal end of the hem of the door panel are formed.

* * * * *